United States Patent [19]

Vuilleumier

[11] 4,223,528
[45] Sep. 23, 1980

[54] UNIDIRECTIONAL GEAR TRANSMISSION

[75] Inventor: Cyril Vuilleumier, Bienne, Switzerland

[73] Assignee: Societe Suisse pour l'Industrie Horlogere Management Services, S.A., Bienne, Switzerland

[21] Appl. No.: 956,525

[22] Filed: Oct. 31, 1978

[51] Int. Cl.³ .................. G04B 19/02; G04C 3/00; F16H 55/06; F16H 55/17
[52] U.S. Cl. .................................. 368/220; 74/462; 74/436; 368/76
[58] Field of Search ............ 74/462, 460, 457, 243 R, 74/435, 436, 437, 84, 820, 393; 58/23 D, 7, 59, 125 R, 4 A, 58

[56] References Cited

U.S. PATENT DOCUMENTS

| 3,813,952 | 6/1974 | Fehrenbacher | 74/84 |
| 4,041,794 | 8/1977 | Belot et al. | 74/460 |
| 4,051,744 | 10/1977 | Oshima | 74/437 |
| 4,104,859 | 8/1978 | Ogihara et al. | 58/23 D |
| 4,108,016 | 8/1978 | Muranishi | 74/462 |

FOREIGN PATENT DOCUMENTS 2328140 10/1976 France.
599485 5/1978 Switzerland.

Primary Examiner—J. V. Truhe
Assistant Examiner—John B. Conklin
Attorney, Agent, or Firm—Griffin, Branigan & Butler

[57] ABSTRACT

A unidirectional gear transmission of reduced axial thickness advantageously employed in timepieces is adapted to be driven by a stepping motor. The driving gear is provided with an alternating pattern of teeth having a first thickness and spacing and sets of two teeth having greater thickness and spacing. The driven gear is provided with an alternating pattern of teeth corresponding to the first thickness teeth of the driving gear and two spaces corresponding to the greater thickness teeth of the driving gear separated by a single tooth. Regular stepping rotation in either sense can be transmitted from the driving gear to the driven gear, but transmission of rotation from driven to driving gear is prevented.

7 Claims, 1 Drawing Figure

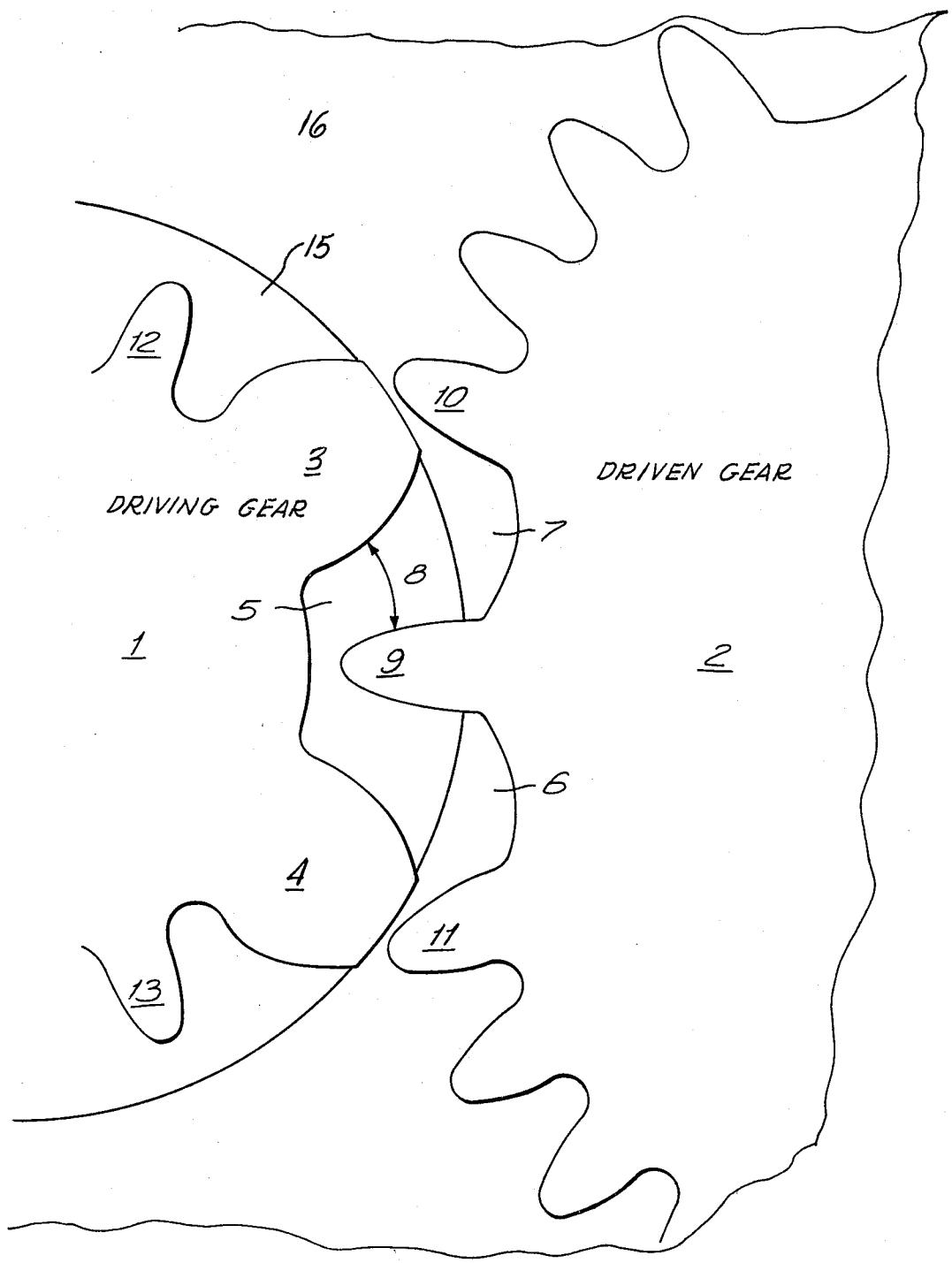

UNIDIRECTIONAL GEAR TRANSMISSION

BACKGROUND OF THE INVENTION

The development of new timepieces in recent years has largely tended to concentrate on the so called quartz type which employs a quartz crystal as time standard and in conjunction therewith may use a classic type display employing time displaying hands driven through the agency of a miniaturized electric stepping motor. The properties of such stepping motors are such that it is highly desirable to avoid that motion or forces be transmitted from the display towards the motor itself. Such transmission of force can easily come about through inertia developed when the timepiece goes through violent changes of motion or direction as is normally the case when it is worn by the user.

Although the inventor is unaware of previous employment of one-way gearing in the specific application hereinafter referred to nevertheless he acknowledges that such gearing is in itself known in various forms. For example Swiss Pat. No. 599 485 illustrates a form of one-way gearing as employed between the gear train and a calendar mechanism in a watch. Various embodiments of this particular one-way gear train have been shown, but all of them have in common that the toothing as shown occurs in two planes. Furthermore, from the description and the drawings of the aforesaid Swiss patent it will be clear that the motion as transmitted will be converted from a regular motion into a stepping motion. In a mechanism where the input itself is a stepping motion this may turn out to be highly undesirable. Furthermore, the fact that the toothing on the gears shown in the prior art occurs in two planes will complicate the manufacture thereof. Finally, such an arrangement as is shown in this particular patent will be thicker than is normally desirable should the mechanism be intended for use in small timepieces such as ladies wristwatches.

Another specialized form of gearing is shown in French patent publication No. 2,328,140. In this case the object is to prevent rotation of a driven gear in the sense opposite to its normal sense of rotation. To obtain the desired effect the driving gear is provided with an alternating pattern of thick and thin teeth while the driven gear has portions cut away from its teeth. In such a manner rotation of the driving gear in the wrong sense is blocked when the teeth butt together between driving and driven gear. Clearly, the object of the French publication as well as the means to obtain such object are different from those of the present invention.

In the present case both driving and driven gear are mutilated in a particular manner as will be hereinafter described in order to arrive at the desired objective. The specific form of mutilation employed in the gear transmission of the present invention enables that rotational motion may be transmitted in either rotation sense from the driving gear to the driven gear. However, should a reaction take place, for instance, in the display arrangement of a wristwatch, the effect of this will not be transmitted back to the stepping drive motor since, in fact, any transmission from the driven gear to the driving gear will be blocked through butting of teeth between the two gears constituting the specific transmission.

Although it is essential for the design and functioning of the present mechanism that drive applied to the driving gear be in the form of a stepping motion, it will be clear from what will follow and what has already been said that although well adapted to the needs of watches, clocks and other instruments of the timekeeping industry the mechanism will also find employment in other arrangements and thus, the invention is not intended to be limited to timekeeping applications.

SUMMARY OF THE INVENTION

The invention accordingly comprises a unidirectional gear transmission comprising a driving gear and a driven gear, the driving gear being rotated in predetermined fixed steps and being provided with teeth of a first thickness separated by a first tooth space and at least one set of two teeth of a second and greater thickness separated by a second and greater tooth space and the driven gear being provided with teeth adapted to mesh with said driving gear teeth of said first thickness and at least one set of two greater tooth spaces adapted to mesh with said teeth of greater thickness whereby stepwise transmission of rotation from said driving gear to said driven gear may be realised in both rotation senses and transmission of rotation from said driven gear to said driving gear between steps is prevented by butting of teeth of said driven gear against teeth of greater thickness of said driving gear.

BRIEF DESCRIPTION OF THE DRAWINGS

The invention may best be appreciated through reference to the single FIGURE which shows in a cutaway view of a lady's wristwatch a plan view of a transmission from a stepping motor to a driven gear in accordance with this invention.

DETAILED DESCRIPTION OF THE INVENTION

Driving gear 1 is arranged so as to be driven in a step by step rotation and might in particular circumstances be conveniently mounted directly on the drive shaft of a stepping motor 15. Such an arrangement would appear appropriate in a small timepiece 16 such as a lady's wristwatch. The drive gear as shown will be provided with sets of teeth of a first thickness and sets of teeth of a second thickness. Although not shown in detail there will be on the drive gear 1 of the specific embodiment two sets of teeth having a first thickness and represented by teeth 12 and 13. Each set will comprise three teeth. There will also be two sets of teeth of the second and greater thickness, each set comprising two teeth 3 and 4 and separated by a tooth space 5. The number of sets of each type of tooth may be varied to suit particular circumstances it being noted however that there are equal numbers of the two types of sets. In the embodiment as shown there are two sets of each type hence the drive gear must be rotated a half revolution at each step or in other words there are two steps per revolution.

The driven gear 2 is provided with sets of teeth represented by 10 and 11 adapted to mesh with the teeth of the type 12 and 13 on the driving gear 1 and is also provided with sets of tooth spaces 6 and 7 adapted to accomodate the teeth having the second and greater thickness on drive gear 1 as represented by 3 and 4 thereon. As shown tooth spaces 6 and 7 adapted to accomodate teeth 3 and 4 are separated by a tooth 9 which will be of the same dimension as teeth 10 and 11.

As shown on the top portion of 2 teeth 10 will be arranged in sets of four and the same applies to teeth 11. It thus becomes apparent that there are three tooth spaces between each of the teeth constituting one of these sets of four said three spaces being adapted to mesh with the teeth 12 and 13 on driving gear 1. The number of sets of teeth 10, 11 and tooth spaces 6, 7 separated by a tooth 9 will be determined in accordance with a desired gear ratio between the driving and the driven gear. It will be obvious from basic principles that the number of sets of teeth and of tooth spaces appearing on gear 2 will be the same just as was the case for gear 1.

From the preceding description and the drawing it will be evident as to how the transmission functions. As shown the arrangement is in between steps as applied to driving gear 1 and accordingly, driven gear 2 will be blocked. In this position should rotation be imparted to driven gear 2 from any external influence teeth 10 and 11 will butt against teeth 3 and 4 respectively and will prevent such rotation from taking place or from being communicated to driving gear 1. Thus, the performance of a stepping motor arranged to drive gear 1 will not be influenced by external forces which may otherwise be transmitted back through the train by driven gear 2.

During a motor step it will be seen that driving gear 1 turns through a predetermined angle and will thereby always be placed in a predetermined position at the end of each such step. When the driving gear 1 begins to turn initially it passes through an angle 8 before having any influence on the driven gear 2. Eventually, one of the teeth 3 or 4 in accordance with the sense of rotation will contact tooth 9 thereby driving gear 2. Tooth 3 or tooth 4 in accordance with the sense of rotation will then be accomodated respectively in tooth space 7 or 6 following which a set of teeth 12 or 13 may mesh respectively with the sets 10 and 11. At the end of the step of the driving motor, driving gear 1 will come to rest precisely as shown in the diagramme except that where there is more than one motor step per revolution a further set of second thickness teeth 3 and 4 will be in the position shown initially. A single set of each tooth type may be provided on the periphery of drive gear 1 for motors having one step per revolution. In any event, the mechanism and its prime mover should be arranged in such a fashion that in between motor steps the position of the parts is substantially as shown in the drawing.

What I claim is:

1. A unidirectional gear transmission comprising a driving gear and a driven gear, the driving gear being rotated in predetermined fixed steps and being provided with at least one first set of driving teeth of a first thickness separated by a first tooth space and at least one second set of two driving teeth of a second and greater thickness separated by a second and greater tooth space, said first and second sets being alternately arranged about the driving gear, and the driven gear being provided with teeth separated by an appropriate space adapted to mesh with, and be driven by, said driving gear teeth of said first thickness, but having at least one set of two greater tooth spaces on said driven gear, greater in size than said appropriate space, adapted to mesh with, and be driven by, said teeth of greater thickness whereby stepwise transmission of rotation from said driving gear to said driven gear may be realised in both rotation senses and transmission of rotation from said driven gear to said driving gear between steps is prevented by butting of teeth of said driven gear against teeth of greater thickness of said driving gear.

2. A unidirectional gear transmission as set forth in claim 1 wherein a plurality of said sets of two teeth of greater thickness are provided on the driving gear, the number of said sets corresponding to the number of steps per revolution of said driving gear.

3. A unidirectional gear transmission as set forth in claim 1 wherein the greater tooth spaces comprising each set thereof on the driven gear are separated by a single tooth.

4. A unidirectional gear transmission as set forth in claim 2 wherein the teeth of said driving gear are arranged around the periphery thereof in a regular alternating pattern of three teeth of the first set of said first thickness and two teeth of the second set of greater thickness.

5. A unidirectional gear transmission as set forth in claim 3 wherein the sets of teeth around the periphery of said driven gear thereof are in a regular alternating pattern of a set of four teeth separated from each other by certain tooth spaces and a set of greater tooth spaces.

6. A unidirectional gear transmission as set forth in claim 1 wherein said driving gear is driven by a stepping motor as employed in a timepiece.

7. A unidirectional gear transmission as set forth in claim 6 wherein said timepiece comprises a wrist watch.

* * * * *